United States Patent [19]

Maine

[11] 4,057,048

[45] Nov. 8, 1977

[54] SOLAR HEAT COLLECTOR

[75] Inventor: DeWitt C. Maine, Redmond, Oreg.

[73] Assignee: Maineline Sales Co., Inc., Redmond, Oreg.

[21] Appl. No.: 630,992

[22] Filed: Nov. 12, 1975

[51] Int. Cl.$^2$ .................................................. F24J 3/02
[52] U.S. Cl. ...................... 126/271; 350/167; 350/201
[58] Field of Search ............... 350/167, 201; 126/270, 126/271; 237/1 A; 60/641

[56] References Cited

U.S. PATENT DOCUMENTS

| | | | |
|---|---|---|---|
| 1,672,750 | 6/1928 | Christiansen | 126/271 |
| 2,636,129 | 4/1953 | Agnew | 126/271 |
| 3,125,091 | 3/1964 | Sleeper, Jr. | 126/271 |
| 3,174,915 | 3/1965 | Edlin | 126/271 |
| 3,182,654 | 5/1965 | Culling | 126/270 |
| 3,886,998 | 6/1975 | Rowekamp | 126/271 |
| 3,901,036 | 8/1975 | Martin | 126/270 X |
| 3,934,573 | 1/1976 | Dandini | 126/270 |

FOREIGN PATENT DOCUMENTS

282,819  10/1971  U.S.S.R. ................................ 126/271

*Primary Examiner*—Kenneth W. Sprague
*Attorney, Agent, or Firm*—Klarquist, Sparkman, Campbell, Leigh, Hall & Whinston

[57] ABSTRACT

A solar heat-collecting structure comprises a series of interconnected transparent lenses forming a dome-shaped roof for receiving direct solar radiation and for transmitting such radiation through the lenses into the enclosure formed thereby and focusing it on a shallow tray of water forming a floor of the enclosure. The inner surfaces of the lenses are coated with a solar radiation-reflective film so that radiation reflected from within the enclosure toward the roof is re-reflected toward the heat-collecting water surface. Means are provided for removing heated water from the tray and replacing it with water to be heated. Each lens in the roof lens system has a focal length dependent on its position on the roof with respect to the water surface so as to concentrate solar radiation at the water surface and thereby maximize the heating effect of such solar radiation in various sun positions.

6 Claims, 7 Drawing Figures

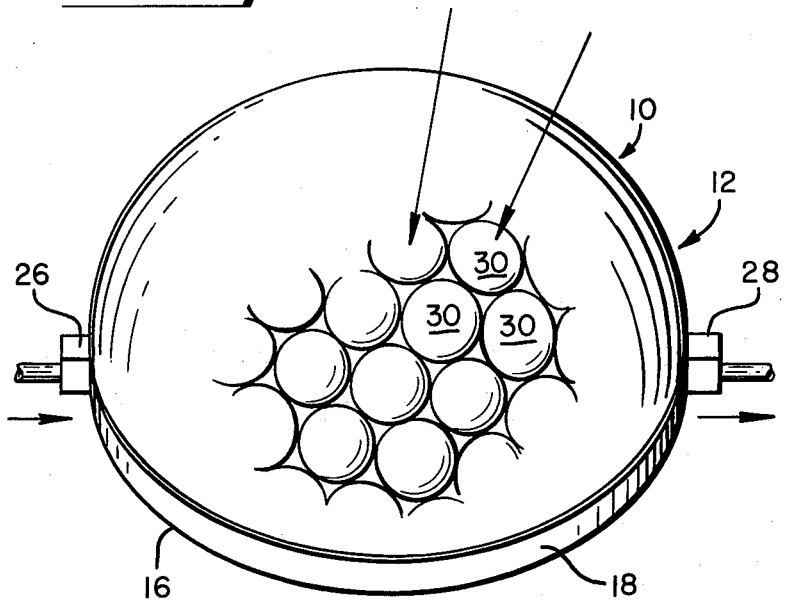
*Fig_1*
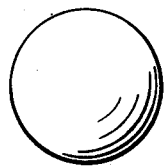 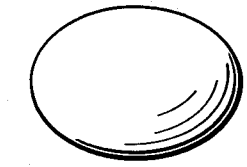 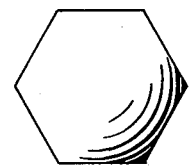 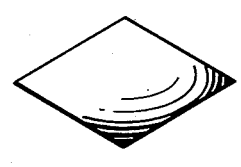 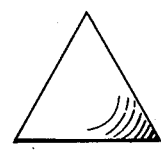
*Fig_3*    *Fig_4*    *Fig_5*    *Fig_6*    *Fig_7*
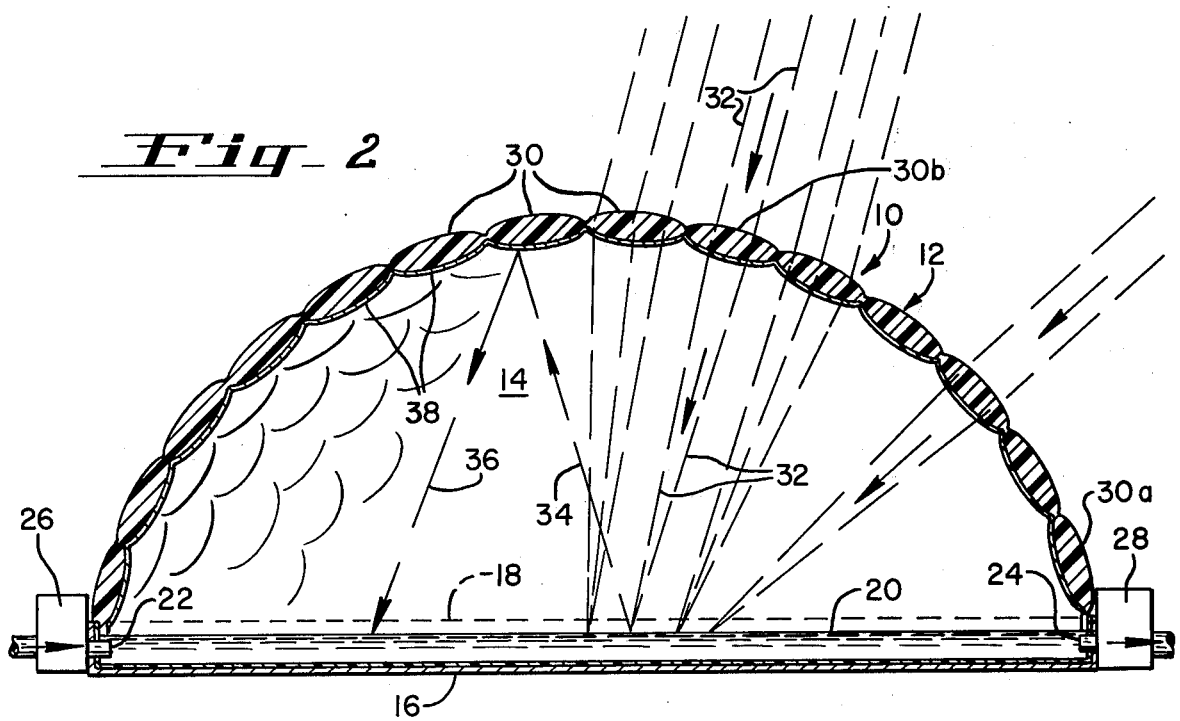
*Fig_2*

SOLAR HEAT COLLECTOR

BACKGROUND OF THE INVENTION

1. Field of the Invention

The present invention relates to a solar heat-collecting structure.

2. Description of the Prior Art

Various solar heat-collecting structures have been proposed for heating liquids and then either storing the heated liquids for future use of for circulating the heated liquid to utilize its heating effect.

For example, a solar heat-collecting structure having a flat transparent slanted roof for transmitting solar radiation to a pool of water within an enclosure beneath the roof is disclosed in Rowekamp U.S. Pat. No. 3,161,193. However, the roof configuration is such that it receives direct solar radiation only during a short part of the daylight hours. Furthermore, there is nothing to prevent the loss of reflected heat and solar radiation from the enclosure through the transparent roof structure.

A solar heat collector having a transparent dome-shaped roof through which solar radiation is transmitted to a heat collector within an enclosure is shown, for example, in Barry U.S. Pat. No. 2,213,894 and Agnew U.S. Pat. No. 2,636,129. However, such structures have no means for preventing the loss of heat and solar radiation by re-reflection from within the enclosure back through the roof to atmosphere. Also, such structures have no means for unsuring that solar radiation will be directed to the heat-collecting means within the enclosure.

In a solar heat-collecting device as shown in Bowen U.S. Pat. No. 2,872,915, two inwardly facing parabolic mirrors form an enclosure within a heat-collecting pipe is positioned. One of the two parabolic mirrors forms a roof for the enclosure which transmits solar radiation into the enclosure toward the opposite parabolic mirror which forms a floor of the enclosure. The floor mirror reflects the solar radiation toward the heat-collecting pipe. The inner surface of the parabolic roof is coated with a radiation-reflective material to give the inner surface of the roof the properties of a parabolic mirror to minimize heat loss from the structure.

Various solar heat-collecting structures have utilized lenses either alone or in combination with reflectors to concentrate solar radiation on a heat-collecting means within an enclosure to which solar radiation is transmitted. In one such device, shown in the Shipman U.S. Pat. No. 1,638,266, the lenses form a flat roof for transmitting solar radiation into an enclosure. These in turn reflect the solar radiation to a heat-collecting pipe centered within the enclosure. In Freeman U.S. Pat. No. 2,277,311, two layers of staggered hemispherical lenses form a flat roof for a heat-collecting enclosure. Solar radiation is converged by the outer spherical lenses as it is transmitted through the outer layer of lenses and then scattered by the inner layer of lenses within the enclosure toward heat-collecting pipes forming a floor beneath the lenses. In a structure such as shown in Huntoon U.S. Pat. No. 895,761 solar radiation is transmitted through a flat slanted roof to reflectors within an enclosure which reflects the radiation to a single central lens which in turn concentrates the solar radiation on a heat-collecting conduit within the enclosure. In a solar heat-collecting device shown in Nonaka U.S. Pat. No. 3,587,559, two spherical lenses beneath a flat transparent roof converge solar radiation to create an intense heat within the enclosure which is transmitted to heat-collecting pipes interspersed amongst the spherical lenses.

Although the foregoing prior art structures have certain advantageous features, no single such structure combines the advantageous features and discards the disadvantageous features of the other structures in a manner to provide a practical, inexpensive heat collector of optimum efficiency and versatility.

SUMMARY OF THE PRESENT INVENTION

The present invention is a solar heat-collecting structure thought to be an improvement over prior solar heat-collecting devices in that it provides direct heating of a heat-collecting liquid such as water by solar radiation through the use of a solar radiation-transmitting roof structure composed of a light refractive material which may be in the form of multiple lenses or prisms which are individually formed depending on their positions on the roof and their distances with respect to liquid surface beneath the roof to direct or concentrate solar radiation on the liquid surface to be heated.

Maximum utilization of the sun's rays during all daylight hours is achieved through positioning of the lenses along a curvilinear surface such as a dome which may be especially desinged for the specific geographic location of the structure for utilizing direct solar radiation when the sun is either low or high in the sky.

Maximum utilization of solar radiation is also achieved by providing the inner surfaces of the roof with solar radiation-reflective properties so that any radiation reflected from the liquid surface toward the roof is re-reflected by the inner roof surfaces back to the liquid surface thereby multiplying the heating effect of the sun's rays and minimixing heat loss through the roof. Rapid heating of the liquid is achieved by containing the liquid in a shallow tray forming a floor of the enclosure and lined with a heat-absorbing material. Means are provided for transporting heated liquid from the tray to storage or circulation means and replacing it with additional liquid to be heated.

A primary object of the present invention is to provide an improved solar heat-collecting structure of high efficiency through maximum utilization of direct solar radiation.

Another primary object is to provide an improved solar heat collector as aforesaid which will have a wide variety of practical agricultural, residential, commercial and industrial heating applications.

The foregoing objects, features and advantages of the present invention will become more apparent from the following detailed description which proceeds with reference to the accompanying drawings.

BRIEF DESCRIPTION OF THE DRAWING

In the drawing:

FIG. 1 is a perspective view from above of a solar heat-collecting structure in accordance with the invention;

FIG. 2 is a vertical sectional view through the structure of FIG. 1 on an enlarged scale; and FIGS. 3 through 7 illustrate various forms of lenses and prisms which may be used in forming the roof structure of the invention.

DETAILED DESCRIPTION

With reference to the drawing, a solar heat-collecting structure or "bubble" 10 is shown in FIG. 1 having a transparent roof structure 12 of light refractive material such as glass or transparent plastic. The roof forms an enclosure 14 (FIG. 2) having a floor 16 formed by a shallow tray 18 filled with water or other heat-collecting liquid 20 which comprises the heat-collecting and -storing medium. Preferably tray 18 is lined with black plastic or other heat-absorbing material to hasten the heating of the water in the tray and promote heat retention. A liquid inlet 22 is provided at one side of the tray and a liquid outlet 24 is provided at the opposite side of the tray for exchanging heated liquid for a liquid to be heated. The inlet side of the tray may also include a manually or automatically operated inlet valve and pumping means 26 for filling the tray with fresh liquid to be heated. The outlet side of the tray may also include a shutoff valve and pumping means 28 for removing heated liquid from the tray. If desired, the valve and pumping means 26, 28 can be thermostatically controlled so that heated liquid within the tray is removed and replaced with fresh liquid automatically when the former is heated to a desired temperature.

In the illustrated embodiment of FIGS. 1 and 2, the transparent roof 12 is composed of a matrix of multiple interconnected convex lenses 30 designed so that solar radiation transmitted through them will be focused or concentrated on the heat-collecting means within the enclosure, in this case the planar surface of the water 20 within tray 18. Where the roof is composed of such lenses, the focal length of different lenses preferably varies depending on the locations of the lenses on the curvilinear roof surface and thus their effective distances from the heat-collecting surface of the water along the floor of the enclosure. For example, the lens 30a near the base of the roof, intended to collect low sun rays, would have a considerably shorter focal length than a lens such as lens 30b near the apex of the roof for collecting high sun rays because of the former's closer proximity to the surface of water 20. The lenses may be of varying sizes and shapes, as exemplified by the lens shapes shown in FIGS. 3-6, depending on the overall size and shape of the roof structure. The orientation of the lenses and their focal lengths will also depend on the nature and position of the heat-collecting means within the enclosure. For example, instead of an open tray of liquid or other planar heat-collecting surface forming a floor of the enclosure, the heat-collecting means might comprise a series of liquid-containing pipes within the enclosure, in which case the lenses would be arranged and oriented to focus directly on such pipes.

If desired, the roof need not be composed of lenses, but instead might be composed of any other light-refracting material and in fact might comprise a single giant convexo-concave lens. Alternatively the roof structure could comprise a series of interconnected prisms such as shown in FIG. 7 of varying shapes and characteristics so as to direct light transmitted through the roof to desired locations within the enclosure where heat-collecting means are positioned.

An important feature of the roof structure is that its inner surface within the enclosure has light-reflective properties although the roof readily transmits external solar radiation therethrough. Thus the solar radiation such as represented by lines 32, when reflected from the surface of water 20 back toward the roof and along the line 34, is re-reflected by the inner surface of the roof along the line 36 back toward the heat-collecting surface of the water 20. This reflectivity feature minimizes heat loss from the enclosure through the roof and multiplies the heating effect of solar radiation transmitted to the enclosure through the roof. The inner surfaces of the roof may be provided with light reflective properties by coating the inner surfaces of the lenses 30 with a thin film 38 of light-reflective metal using a well-known vacuum metallizing process. This gives the roof the characteristics of one-way glass, permitting light to enter the enclosure but not leave. Regardless of the refractive nature of the roof with respect to entering light rays, its inner surface should have such light-reflective properties for optimum heat-collecting and retention efficiency.

Although the roof in the illustrated embodiment has a dome shape, in practice the roof may be provided with a curvature which will maximize its solar radiation collecting potential, depending on its geographic location and orientation with respect to the sun during daylight hours and the location of light-blocking surrounding structures. For example, a dome or cylindrical shape might be of greatest advantage in a desert setting near the equator where the sun will pass from east to west almost directly overhead. However, an entirely different roof shape might be most efficient for a heat-collecting structure in far northern latitudes where the structure will be exposed to solar radiation from a low sun position most of the time.

It is contemplated that the roof structure will be formed of a cast transparent plastic material within a mold suitably formed after the most advantageous roof shape and lens focal lengths, positions and orientations have been mathematically determined. Once a mold has been constructed for a particular heat-collecting structure suited for a general geographic region, the structure should be capable of efficient mass production.

Having illustrated and described the principles of my invention by what is presently a preferred embodiment, it should be apparent to those skilled in the art that such embodiment may be modified in arrangement and detail without departing from such principles. I claim as my invention all such modifications as come within the true spirit and scope of the following claims.

I claim:

1. A solar heat-collecting structure comprising:
    a roof structure generally curved to define an enclosure for receiving direct solar light radiation from variable sun positions,
    a planar heat-collecting surface forming a floor of said enclosure,
    a plurality of light lenses disposed within and comprising an integral portion of said roof structure, such lenses having various and different focal lengths and being fixedly disposed in various and different attitudes determined by such lenses' locations in said roof structure for collectively transmitting, directing and focusing solar light radiation received from variable sun positions onto different portions of said planar heat-collecting surface to cause simultaneous heating of said different portions,
    said roof structure having a light-reflective interior surface, such surface including the inwardly facing surfaces of said light lenses for reflecting light radiation incident to such light-reflective interior surface back toward said heat-collecting surface while concurrently transmitting solar light radiation into said enclosure and onto said heat-collecting surface.

2. A structure according to claim 1 wherein said light-reflective interior surface comprises a metallic film to provide said light-reflective properties.

3. A structure according to claim 1 wherein said planar heat-collecting surface includes the surface of a liquid to be heated by solar light radiation.

4. A structure according to claim 3 wherein said liquid is confined within a shallow tray disposed within said enclosure and means are provided for introducing liquid to be heated into said tray and for discharging heated liquid from said tray.

5. A structure according to claim 4 wherein the inner surfaces of said tray have heat-absorbing properties.

6. A structure according to claim 1 wherein the curvature of said roof is shaped to maximize the heat-collecting properties of said enclosure with the sun at varying positions with respect to said structure including both high and low sun positions with respect to the horizon.

* * * * *

UNITED STATES PATENT OFFICE
CERTIFICATE OF CORRECTION

Patent No. 4,057,048            Dated Nov. 8, 1977

Inventor(s) DeWITT C. MAINE

It is certified that error appears in the above-identified patent and that said Letters Patent are hereby corrected as shown below:

Column 1, line 11, "of" should be --or--;
Column 1, line 31, "unsuring" should be --ensuring--;
Column 1, line 36, after "within", --which-- was omitted;
Column 1, line 51, "Pat. 1,638,266" should be --Pat. 1,683,266--;
Column 2, line 28, "desinged" should be --designed--;
Column 2, line 38, "minimixing" should be --minimizing--.

Signed and Sealed this

Twenty-eighth Day of March 1978

[SEAL]

Attest:

RUTH C. MASON
Attesting Officer

LUTRELLE F. PARKER
Acting Commissioner of Patents and Trademarks